United States Patent
Nawrot et al.

(10) Patent No.: US 12,538,266 B2
(45) Date of Patent: Jan. 27, 2026

(54) DIFFERENTIATION SUPPORT IN PAGING PROCEDURES

(71) Applicant: Telefonaktiebolaget LM Ericsson (publ), Stockholm (SE)

(72) Inventors: Bartosz Nawrot, Cracow (PL); Demia Della Penda, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 397 days.

(21) Appl. No.: 18/021,830

(22) PCT Filed: Aug. 19, 2021

(86) PCT No.: PCT/IB2021/057642
§ 371 (c)(1),
(2) Date: Feb. 17, 2023

(87) PCT Pub. No.: WO2022/038559
PCT Pub. Date: Feb. 24, 2022

(65) Prior Publication Data
US 2024/0015694 A1   Jan. 11, 2024

Related U.S. Application Data

(60) Provisional application No. 63/067,509, filed on Aug. 19, 2020.

(51) Int. Cl.
*H04W 68/02* (2009.01)
*H04W 84/04* (2009.01)

(52) U.S. Cl.
CPC .......... *H04W 68/02* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2019/0349774 A1* | 11/2019 | Lou | H04W 36/13 |
| 2021/0092710 A1* | 3/2021 | Tiwari | H04W 68/02 |
| 2021/0099921 A1 | 4/2021 | Han et al. | |

FOREIGN PATENT DOCUMENTS

| | | |
|---|---|---|
| WO | 2019242724 A1 | 12/2019 |
| WO | 2020033174 A1 | 2/2020 |

OTHER PUBLICATIONS

International Search Report and Written Opinion of the International Searching Authority, PCT/IB2021/057642, mailed Nov. 17, 2021, 13 pages.
China Telecom, "TP for NPN Paging," 3GPP TSG RAN WG3#106, R3-196863, Reno, Nevada, Nov. 18-22, 2019, 5 pages.

(Continued)

*Primary Examiner* — Frantz Bataille
(74) *Attorney, Agent, or Firm* — Sage Patent Group (57) ABSTRACT

A first network node, operating in a communications network that includes a second network node, can receive a message from the second network node. The message can include a request to page a communication device and a single-network slice selection assistance information, S-NSSAI, and/or a public land mobile network, PLMN, identifier, ID, associated with the request. The first network node can determine whether to page the communication device based on the S-NSSAI and/or the PLMN ID.

18 Claims, 6 Drawing Sheets

(56) References Cited

OTHER PUBLICATIONS

Huawei, "Discussion on paging for NPN," 3GP TSG-RAN3 Meeting #105, R3-195767, Chongqing, China, Oct. 14-18, 2019, 3 pages.
Nokia et al, "Provision of NSSAI by CN for overload control," 3GPP TSG-RAN WG2 Meeting NR Adhoc 1807, R2-1810146, Montreal, Canada, Jul. 2-6, 2018, 3 pages.
Nokia et al., "Response to R3-184891," 3GPP TSG-RAN WG3#101, R3-185101, Gothenburg, Sweden, Aug. 20-24, 2018, 2 pages.
3GPP TS 23.501 v16.5.0 (Jul. 2020); 3rd Generation Partnership Project; Technical Specification Group Services and System Aspects; System architecture for the 5G System (5GS); Stage 2 (Release 16), 441 pages.
3GPP TS 38.304 v16.0.0 (Mar. 2020); 3rd Generation Partnership Project; Technical Specification Group Radio Access Network; NR; User Equipment (UE) procedures in Idle mode and RRC Inactive state (Release 16), 38 pages.
3GPP TS 38.331 v15.9.0 (Mar. 2020); 3rd Generation Partnership Project; Technical Specification Group Radio Access Network; NR; Radio Resource Control (RRC) protocol specification (Release 15), 536 pages.
3GPP TS 38.413 v16.1.0 (Mar. 2020); 3rd Generation Partnership Project; Technical Specification Group Radio Access Network; NG-RAN; NG Application Protocol (NGAP) (Release 16), 341 pages.
3GPP TS 38.423 v16.1.0 (Mar. 2020); 3rd Generation Partnership Project; Technical Specification Group Radio Access Network; NG-RAN;Xn application protocol (XnAP) (Release 16), 334 pages.
3GPP TS 22.261 v17.3.0 (Jul. 2020); 3rd General Partnership Project; Technical Specification Group Services and System Aspects; Service requirements for the 5G system; Stage 1 (Release 17), 83 pages.

\* cited by examiner

Receive a message from a second network node including a request to page a communication device and a S-NSSAI and/or a PLMN ID
810

Determine not to page the communication device based on the S-NSSAI and/or the PLMN ID
820

Discard the message
830

FIG. 8

Receive a message from a second network node including a request to page a communication device and a S-NSSAI and/or a PLMN ID
810

Determine to page the communication device based on the S-NSSAI and/or the PLMN ID
920

Page the communication device
930

Receive a RRC setup request message
940

Fetch context information associated with the communication device
950

DIFFERENTIATION SUPPORT IN PAGING PROCEDURES

CROSS REFERENCE TO RELATED APPLICATIONS

This application is a 35 U.S.C. § 371 national stage application of PCT International Application No. PCT/IB2021/057642 filed on Aug. 19, 2021, which in turn claims domestic priority to U.S. Provisional Patent Application No. 63/067,509 filed on Aug. 19, 2020, the disclosures and content of which are incorporated by reference herein in their entirety.

TECHNICAL FIELD

The present disclosure is related to wireless communication systems and more particularly to request differentiation support in paging procedures.

BACKGROUND

Figure 1:
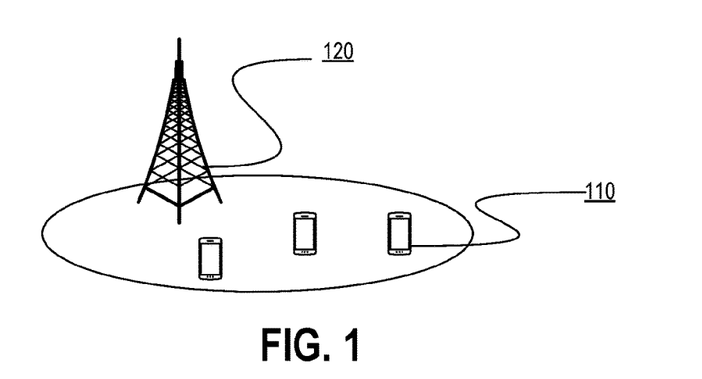
FIG. 1 is a schematic diagram illustrating an example of a $5^{th}$ generation ("5G") network.

FIG. 1 illustrates an example of a $5^{th}$ Generation ("5G") network including a network node 120 (e.g., a 5G base station ("gNB")) and multiple communication devices 110 (also referred to as user equipment ("UE")).

When new downlink data arrives for the communication device 110 while it is in an IDLE or an INACTIVE state, the network can trigger a paging procedure to establish the connection that allows the network node 120 to deliver the data. The paging procedure can be triggered either from a core network ("CN") node or from a radio access network ("RAN") node, depending on the radio resource control ("RRC") state of the communication device 110 (e.g., if is in an IDLE or in an INACTIVE state) and its location.

For example, mobile terminating ("MT")-data for a UE in an RRC_IDLE state arrives at an access and mobility management function ("AMF"), the AMF can initiate a paging procedure by transmitting a paging message to all gNBs in a tracking area ("TA") list of the UE. In response to receiving the paging message, a gNB can page the UE within its relevant cells.

In another example, if the UE to be paged is in RRC_INACTIVE state, the CN can forward the downlink packets towards an anchor gNB (e.g., the RAN node where the UE context is stored), which can initiate the RAN paging procedure to reach the UE if it is camping in any of the other gNBs that are part of the RAN paging area of the UE.

SUMMARY

According to some embodiments, a method of operating a first network node operating in a communications network that includes a second network node is provided. The method includes receiving a message from the second network node. The message including a request to page a communication device and single-network slice selection assistance information, S-NSSAI, and/or a public land mobile network, PLMN, identifier, ID, associated with the request. The method can further include determining whether to page the communication device based on the S-NSSAI and/or the PLMN ID.

According to other embodiments, a method of operating a second network node operating in a communications network that includes a first network node is provided. The method can include determining to page a communication device regarding a service. The method can further include determining single-network slice selection assistance information, S-NSSAI, and/or a public land mobile network, PLMN, identifier, ID, associated with the service. The method can further include transmitting a paging request that includes the S-NSSAI and/or the PLMN ID to the first network node.

According to other embodiments, a first network node, a second network node, computer program, and/or computer program product is provided for performing one or more of the above methods.

In various embodiments described herein, by including the S-NSSAI and/or the PLMN ID in the paging messages, gNBs supporting connection differentiation (e.g., slicing or RAN sharing among multiple operators) via radio resource partitioning can disregard paging requests for connections that belong to partitions with currently no resource availability in RAN. Disregarding these paging requests can avoid wasting resources paging, signaling, and performing a random access procedure.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive.

Components from one embodiment may be tacitly assumed to be present/used in another embodiment.

In some examples, a 5G base station ("gNB") (also referred to as a radio access network ("RAN") node) can be overloaded and a paging control mechanism can be used at the gNB to disregard some of the paging requests according to their paging priority.

A communication device (also referred to as a user equipment ("UE")) can be paged by the network in order to receive data for a specific service. With the introduction of the slicing framework in 5G systems, services can belong to different slices. Single-network slice selection assistance information ("S-NSSAI") can be used to uniquely identify a network slice and can be associated to a requested service (and a packet data unit ("PDU") session).

In the context of UE and service differentiation also the Public Land Mobile Networks ("PLMN") identifier ("ID") associated to each UE is going to be used for connection differentiation in 5G systems. For example, to control roaming, or in case of network sharing agreement between different operators, such as the Multi-Operator Core Network ("MOCN") and the Multi-Operator RAN ("MORAN") approaches.

In some examples, a RAN node can receive a paging request that includes a paging message from a network function (e.g., an access and mobility management function ("AMF") or a core network node. In additional or alternative examples, a RAN node can receive a paging request that includes a RAN paging message from another RAN node.

Radio resource partitioning ("RRP") can support the slicing concept in RAN, as well as request differentiation based on PLMN ID indicator. RRP can allow reservation and/or limitation of an amount of RAN resources that can be used by connections belonging to a given partition. A partition can be identified by one or multiple S-NSSAI(s) and PLMN ID(s). If RAN resources (e.g., processing, hardware and air interface resources) are partitioned between different slices, there can be situations when some of the partitions are overloaded and cannot accept any additional connection.

In some examples, paging requests for services belonging to overloaded partitions will be broadcasted in the relevant cells even though the corresponding mobile terminating ("MT")-access will be rejected by an admission control because of a resource shortage. The admission control can identify the slice that the incoming connection request belongs to after fetching all information either from a core network ("CN") (if the paged UE was in an IDLE mode) or from an anchor gNB (if the paged UE was in an INACTIVE state). Therefore, the paging messages for connection requests that are going to be rejected may be broadcasted in the cells anyway, which can result in a waste of resources.

Figure 3:
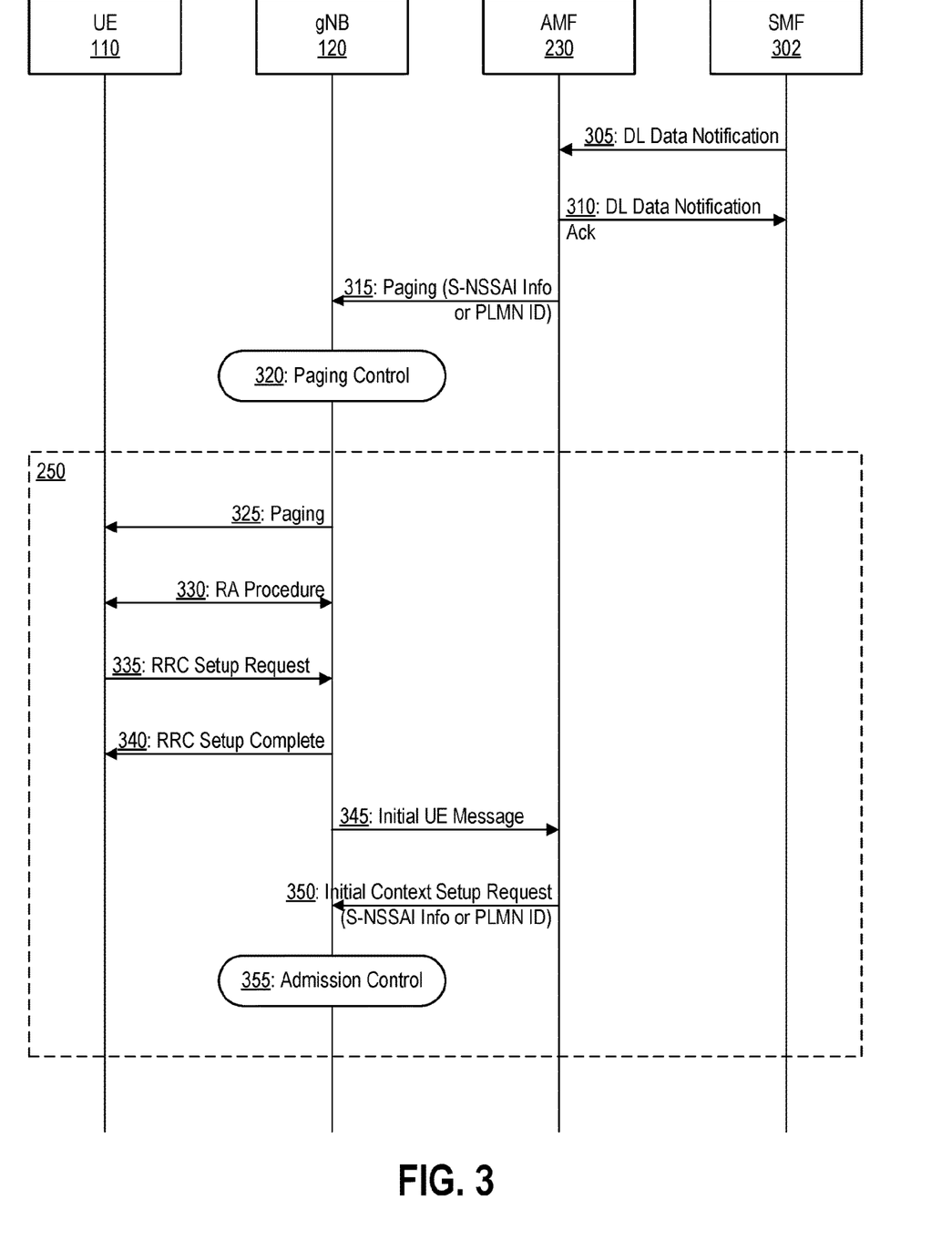
FIG. 3 is a signal flow diagram illustrating an example of operations for handling a paging request from a core network node in accordance with some embodiments.
Figure 4:
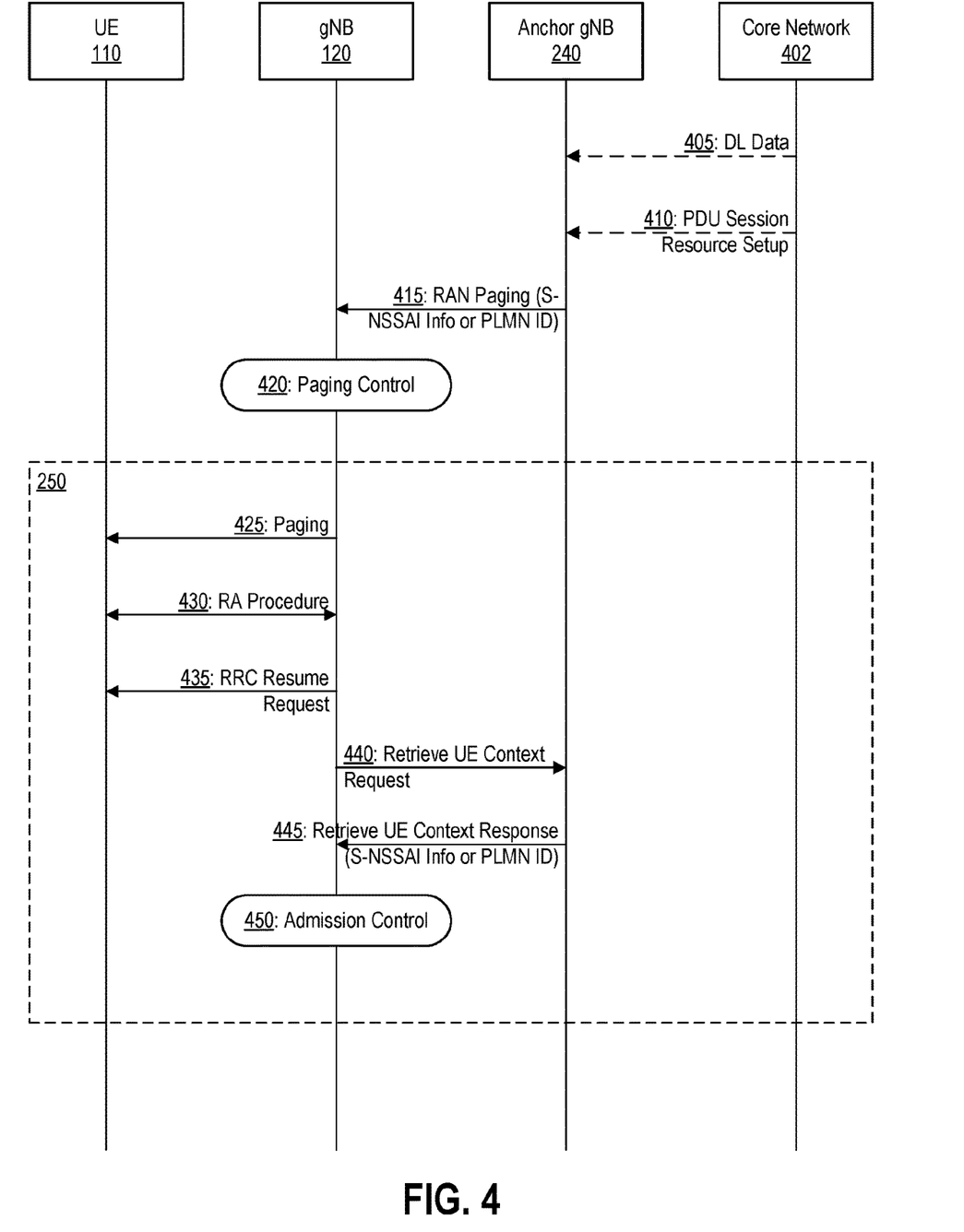
FIG. 4 is a signal flow diagram illustrating an example of operations for handling a paging request from an anchor radio access network node in accordance with some embodiments.

Various embodiments described herein add the S-NSSAI and PLMN ID associated to the request and UE to be paged in the paging request (e.g., in both the paging message 315 of FIG. 3 and the RAN paging message 415 of FIG. 4). This information can allow the gNB to disregard paging requests belonging to overloaded partitions at an earlier stage compared to the admission control rejection. Thus, a more efficient consumption of signaling, hardware, paging, and random-access resources can be achieved.

The PLMN ID and the S-NSSAI added to the paging request can be assigned by a CN (for users paged when the UE is in an IDLE state) or by an anchor gNB (for users paged when the UE is in an INACTIVE state) according to the service to which the downlink data to deliver is mapped to.

The S-NSSAI and PLMN ID can also be combined with the paging priority information for a finer differentiation. For example, given an overloaded partition corresponding to a S-NSSAI (or PLMN ID), paging requests with that S-NSSAI (or PLMN ID) can be sent to the UEs only if their paging priority is above a threshold value. In some examples, this is because requests with a high paging priority have a higher chance to get accepted by the admission control function and/or to possibly preempt other existing connections. In additional or alternative embodiments, the threshold value can be determined based on the S-NSSAI (or PLMN ID) and/or the load on the partition corresponding to the S-NSSAI (or PLMN ID).

In some embodiments, paging control with RRP for slicing support can increase accessibility for some services. For example, paging control based on slicing information can reduce a possibility of congesting the random-access channel by MT-access requests that the admission control will not accept because belonging to slices with partitions that have already consumed their assigned share of resources. In additional or alternative embodiments, paging control with RRP for slicing support can provide a more efficient utilization of the network resources. For example, paging control based on slicing information can decrease an amount of RAN resources spent for MT-access requests that the admission control will not accept because belonging to slices with partitions that have already consumed their assigned share of resources. In additional or alternative embodiments, each paging occasion can address a limited number of UEs. Disregarding paging requests for services that cannot be accepted in RAN because belonging to slices with partitions that have consumed their assigned share of resources can lead to a more efficient use of the limited paging records that can be broadcasted at once. This can reduce paging load of no use and increase speed for paging to UEs that are more likely to be accepted in RAN.

Figure 5:
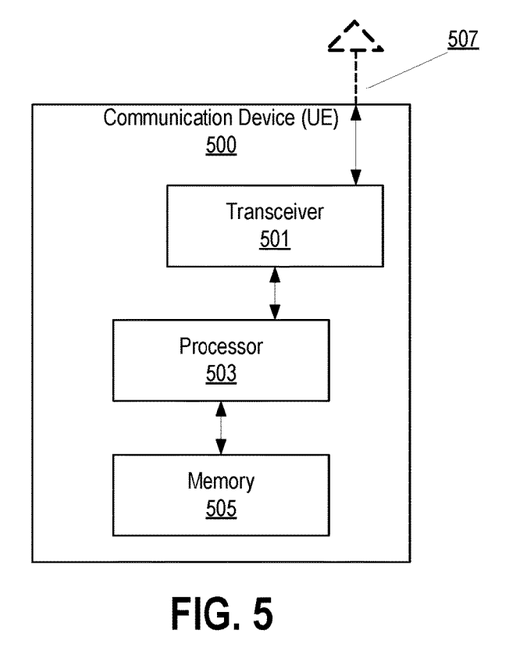
FIG. 5 is a block diagram illustrating an example of a communication device in accordance with some embodiments.

FIG. 5 is a block diagram illustrating elements of a communication device 500 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 500 may be provided. As shown, communication device 500 may include an antenna 507, and transceiver circuitry 501 (also referred to as a transceiver) including a transmitter and a receiver configured to provide uplink and downlink radio communications with a base station(s) (also referred to as a RAN node) of a radio access network. Communication device 500 may also include processing circuitry 503 (also referred to as a processor) coupled to the transceiver circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that separate memory circuitry is not required. Communication device 500 may also include an interface (such as a user interface) coupled with processing circuitry 503, and/or communication device UE may be incorporated in a vehicle.

As discussed herein, operations of communication device 500 may be performed by processing circuitry 503 and/or transceiver circuitry 501. For example, processing circuitry 503 may control transceiver circuitry 501 to transmit communications through transceiver circuitry 501 over a radio interface to a radio access network node (also referred to as a base station) and/or to receive communications through transceiver circuitry 501 from a RAN node over a radio interface. Moreover, modules may be stored in memory circuitry 505, and these modules may provide instructions so that when instructions of a module are executed by processing circuitry 503, processing circuitry 503 performs respective operations.

Figure 6:
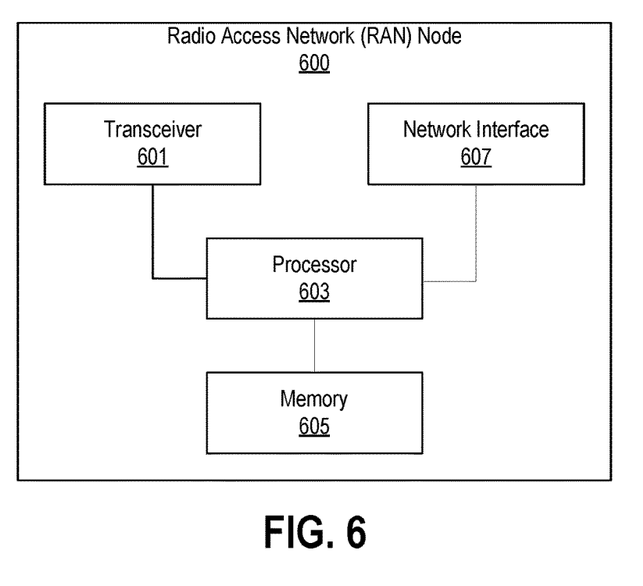
FIG. 6 is a block diagram illustrating an example of a radio access network ("RAN") node in accordance with some embodiments.

FIG. 6 is a block diagram illustrating elements of a radio access network ("RAN") node 600 (also referred to as a network node, base station, eNodeB/eNB, gNodeB/gNB, etc.) of a Radio Access Network (RAN) configured to provide cellular communication according to embodiments of inventive concepts. As shown, the RAN node 600 may include transceiver circuitry 601 (also referred to as a transceiver) including a transmitter and a receiver configured to provide uplink and downlink radio communications with mobile terminals. The RAN node 600 may include network interface circuitry 607 (also referred to as a network interface) configured to provide communications with other nodes (e.g., with other base stations) of the RAN and/or core network CN. The RAN node 600 may also include processing circuitry 603 (also referred to as a processor) coupled to the transceiver circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the RAN node 600 may be performed by processing circuitry 603, network interface 607, and/or transceiver 601. For example, processing circuitry 603 may control transceiver 601 to transmit downlink communications through transceiver 601 over a radio interface to one or more mobile terminals UEs and/or to receive uplink communications through transceiver 601 from one or more mobile terminals UEs over a radio interface. Similarly, processing circuitry 603 may control network interface 607 to transmit communications through network interface 607 to one or more other network nodes and/or to receive communications through network interface from one or more other network nodes. Moreover, modules may be stored in memory 605, and these modules may provide instructions so that when instructions of a module are executed by processing circuitry 603, processing circuitry 603 performs respective operations.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 7:
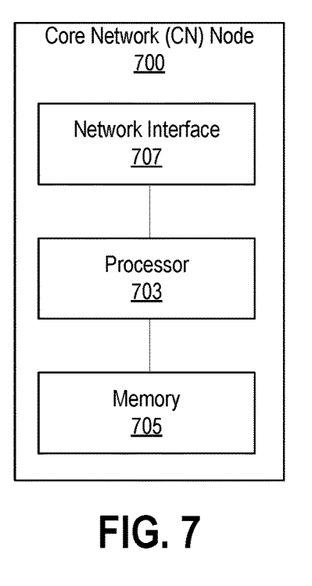
FIG. 7 is a block diagram illustrating an example of a core network ("CN") node in accordance with some embodiments.

FIG. 7 is a block diagram illustrating elements of a core network ("ON") node 700 (e.g., an SMF node, an AMF node, an AUSF node, a UDM node, etc.) of a communication network configured to provide cellular communication according to embodiments of inventive concepts. As shown, the CN node 700 may include network interface circuitry 707 (also referred to as a network interface) configured to provide communications with other nodes of the core network and/or the RAN. The CN node 700 may also include a processing circuitry 703 (also referred to as a processor) coupled to the network interface circuitry, and memory circuitry 705 (also referred to as memory) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required.

As discussed herein, operations of the CN node 700 may be performed by processing circuitry 703 and/or network interface circuitry 707. For example, processing circuitry 703 may control network interface circuitry 707 to transmit communications through network interface circuitry 707 to one or more other network nodes and/or to receive communications through network interface circuitry from one or more other network nodes. Moreover, modules may be stored in memory 705, and these modules may provide instructions so that when instructions of a module are executed by processing circuitry 703, processing circuitry 703 performs respective operations.

Figure 2:
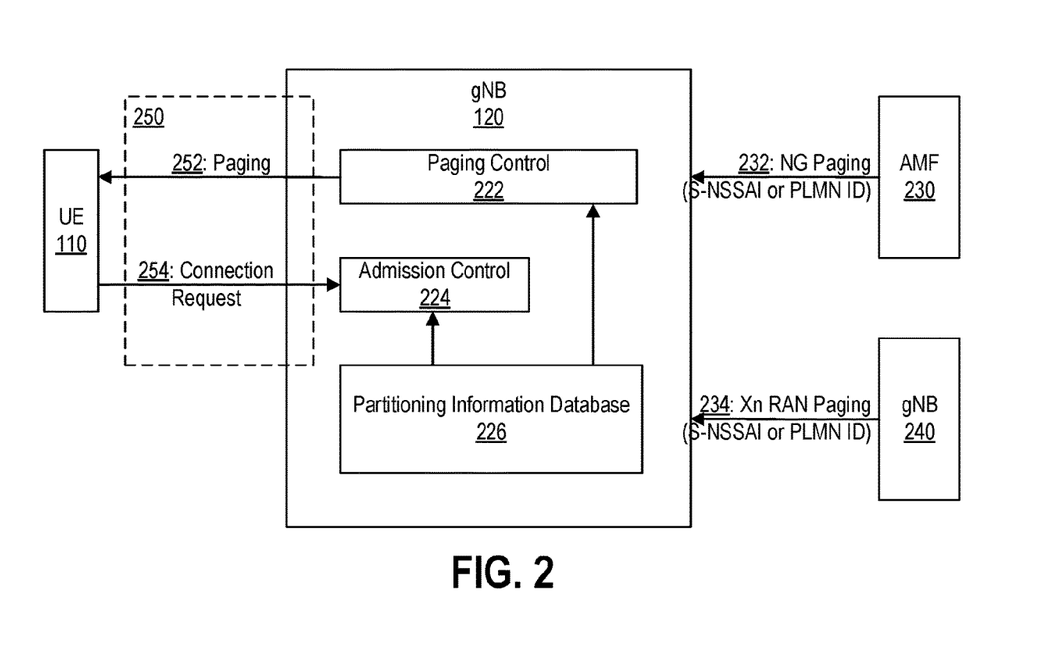
FIG. 2 is a block diagram illustrating an example of a 5G network configured to page a communication device in accordance with some embodiments.

FIG. 2 illustrates a block diagram of an example of a network configured to page a UE 110. In this example, the network includes a first gNB 120, (optionally) an AMF 230, and (optionally) a second gNB 240. The first gNB 120 can include a partitioning information database 226 coupled to a paging control 222 and an admission control 224. The partitioning information database 226 can provide load metrics with respect to one or more partitions to the paging control 222 and/or the admission control 224.

For paging procedures controlled by the CN that includes AMF 230, at operation 232, the AMF 230 sends a paging message over a next generation ("NG") interface to the first gNB 120. In some examples, the AMF 230 transmits the paging message to all gNBs in a UE tracking area ("TA"). The paging message can indicate, when applicable, the S-NSSAI associated to the service for which the UE is being paged and the PLMN ID serving the UE.

Similarly, for paging procedures controlled by the RAN, the second gNB 240 (also referred to as the anchor gNB) transmits, at operation 234, over the Xn interface the RAN paging messages to the first gNB 120. The paging message can indicate, when applicable, the S-NSSAI and the PLMN ID associated to the service for which the UE is being paged.

The paging control 222 in the first gNB 120 can decide whether to perform the paging operation 250 or disregard the paging request based on the RAN resource availability for new MT-Access requests with the given request identifier (slice ID and/or PLMN ID). In response to determining to proceed with paging the UE 110, at operation 252 the first gNB 120 can page the UE 110. For example, the first gNB 120 can broadcast the paging message within the relevant cells. At operation 254, the first gNB 120 can receive the connection request from the UE 110.

FIG. 3 illustrates an example of operations performed for handling a paging request originating from the CN (e.g., when the UE is in an RRC IDLE state).

The arrival of downlink packets at a session management function ("SMF") 302 of the CN can trigger, at operation 305, a downlink ("DL") data notification message to be transmitted by the SMF 302 to the AMF 230 of the CN. The DL data notification message can indicate a need to page the UE 110. At operation 310, the AMF 230 can respond by transmitting a DL data notification acknowledgment to the SMF 302. At operation 315, the AMF 230 transmits a NGAP paging message to the gNB 120. In some examples, the AMF 230 transmits the paging message to all gNBs with cells belonging to the UE TA. The paging message can include the slice indicator, S-NSSAI, associated to the service for which the UE 110 needs to be paged and the PLMN ID associated in CN to the UE to be paged.

At operation 320, the gNB performs a paging control mechanism that collects information on the capability of the RAN to accept a new incoming MT access request belonging to the S-NSSAI and PLMN ID indicated in the paging request. If there are no resources available for the requested indicators, the paging control function discards the paging message. Otherwise, the paging operations 250 are performed.

In this example, the paging operations 250 include, at operation 325, the gNB 120 paging the UE 110. At operation 330, the UE 110 and the gNB 120 perform a random access ("RA") procedure. At operation 335, the gNB 120 receives a RRC setup request message from the UE 110. In response to receiving the RRC Setup Request message from the paged UE 110, at operation 340, the gNB 120 responds with a RRC setup complete message. Then the gNB 120 fetches UE context information from the CN by, at operation 345, gNB 120 transmits an initial UE message to the AMF 230 and, at operation 350, receiving an initial context setup request of the AMF 230 that can indicate the slice used for the UE communication. At operation 355, the gNB 120 performs an admission control mechanism that rejects the context setup request if no RAN resources are available for the indicated slice.

FIG. 4 illustrates an example of operations performed for handling a paging request originating from an anchor gNB 240 (e.g., where the UE context of an RRC INACTIVE UE is stored.

In some examples, at operation 405, DL data for a UE 110 in an INACTIVE state are received at the anchor gNB 240 from a network function (e.g., a user plane function ("UPF")) in a core network 402. In alternative examples, at operation 410, a PDU session resource setup message is received at the anchor gNB 240 from a network function (e.g., an AMF) of the core network 402.

In response to DL data or the PDU session resource setup message, the anchor gNB 240 can page the UEs within its cells that are part of the UE's TA list. Furthermore, the anchor gNB 240 can transmit the RAN paging message towards other gNBs with cells in the TA list. At operation 415, the anchor gNB 240 transmits the RAN paging message to the first gNB 120. The RAN paging message can include information on the S-NSSAI associated to the service for which the UE needs to be paged, and the PLMN ID associated to the UE to be paged.

At operation 420, the first gNB 120 performs a paging control mechanism in which it collects information on the capability of the RAN to accept new incoming MT access requests belonging to the indicated S-NSSAI (and PLMN). If there are no resources available for the requested partition, the paging control function can discard the paging message. Otherwise, the paging operations 250 are performed.

In this example, the paging operations 250 include, at operation 425, the gNB 120 paging the UE 110. At operation 430, the UE 110 and the gNB 120 perform a random access ("RA") procedure. At operation 435, the gNB 120 receives a RRC resume request message from the UE 110. In response to receiving the RRC Setup Request message from the paged UE 110, at operation 440, the gNB 120 fetches UE context information from anchor gNB 240 by transmitting a retrieve UE context request message. At operation 445, gNB 120 receives a retrieve UE context response message that can indicate the slice used for the UE communication. At operation 450, the gNB 120 performs an admission control mechanism that rejects the context setup request if no RAN resources are available for the indicated slice.

In some embodiments, by including the S-NSSAI and the PLMN ID in the paging messages, gNBs supporting slicing and UE differentiation via radio resource partitioning can disregard paging requests for connections that belong to slices with currently no resource availability in RAN. This can avoid a waste of paging, signaling, random access, and hardware resources.

Figure 8:
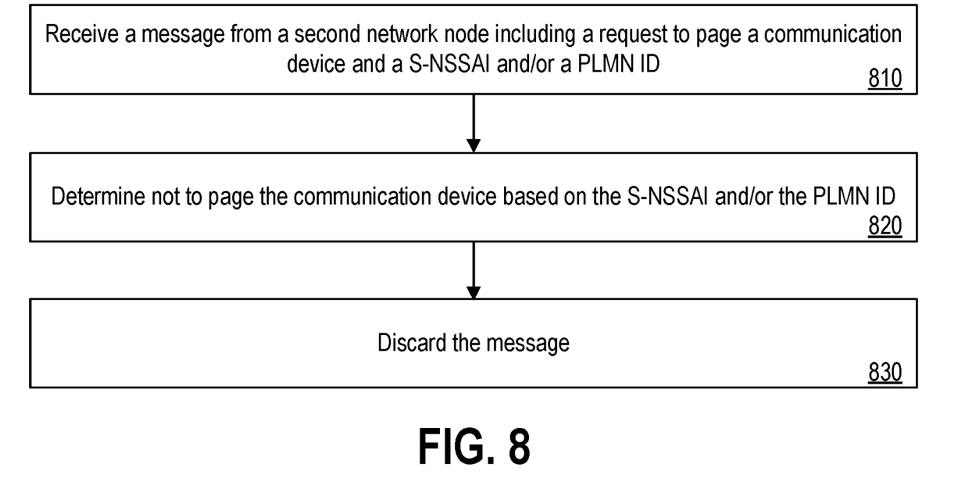
FIGS. 8-9 are flow charts illustrating examples of operations performed by a first network node in accordance with some embodiments.
Figure 9:
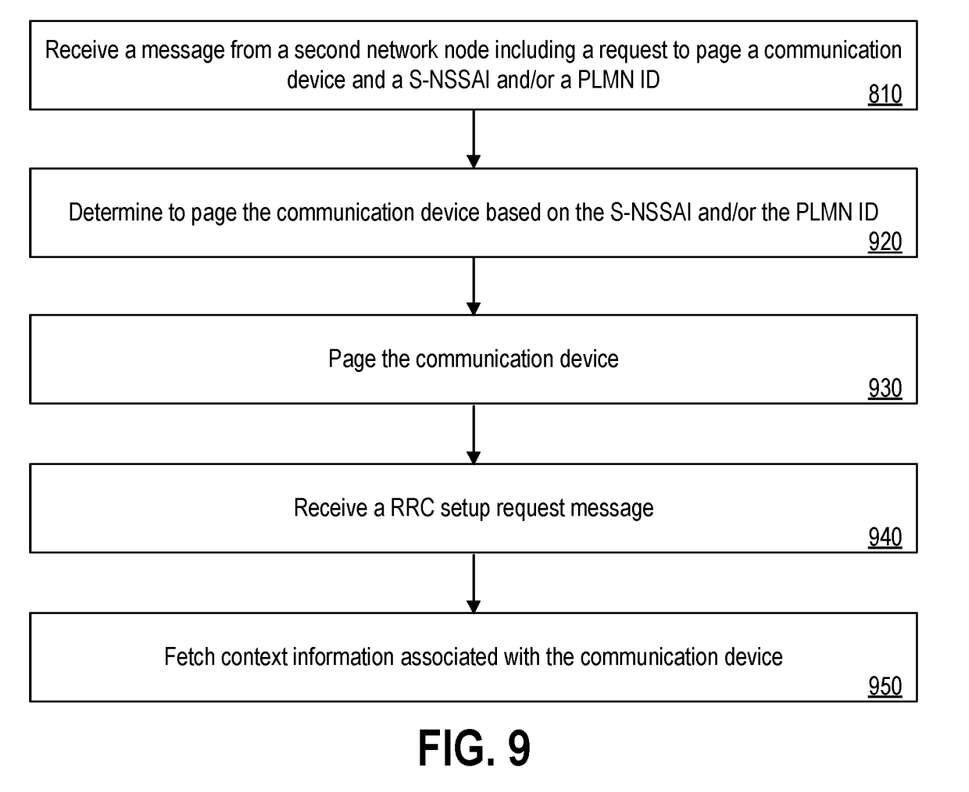

Operations of a first network node will now be discussed with reference to the flow charts of FIGS. 8-9 according to some embodiments of inventive concepts. FIGS. 8-9 will be described below as being performed by a RAN node 600 as implemented using the structure of the block diagram of FIG. 6). For example, modules may be stored in memory 605 of FIG. 6, and these modules may provide instructions so that when the instructions of a module are executed by respective processing circuitry 603, processing circuitry 603 performs respective operations of the flow charts. However, the operations in FIGS. 8-9 may be performed by any suitable network node.

FIG. 8 illustrates an example of operations performed by a first network node operating in a communications network that includes a second network node to avoid paging a communication device based on S-NSSAI (or PLMN ID).

At block 810, processing circuitry 603 receives, via network interface 607, a message from a second network node including a request to page the communication device and the S-NSSAI or the PLMN ID. In some embodiments, the message further includes a paging priority associated with the request.

At block 820, processing circuitry 603 determines not to page the communication device based on the S-NSSAI or the PLMN ID. In some embodiments, determining not to page the communication device includes determining a partition associated with the S-NSSAI or the PLMN ID; determining an amount of available resources on the partition; and determining not to page the communication device based on the amount of available resources being below a predetermined threshold amount.

In additional or alternative embodiments, determining not to page the communication device includes determining that the paging priority is below a threshold value. In additional or alternative embodiments, processing circuitry 603 determines the threshold value based on the S-NSSAI information and/or the PLMN ID.

At block 830, processing circuitry 603 discards the message. In some embodiments, discarding the message includes avoiding and/or preventing paging of the communication device.

FIG. 9 illustrates an example of operations performed by a first network node operating in a communications network that includes a second network node to proceed with paging a communication device based on a S-NSSAI or a PLMN ID.

At block 810, processing circuitry 603 receives, via network interface 607, a message from a second network node including a request to page the communication device and the S-NSSAI or the PLMN ID. In some embodiments, the message further includes a paging priority associated with the request.

At block 920, processing circuitry 603 determines to page the communication device based on the S-NSSAI or the PLMN ID. In some embodiments, determining to page the communication device includes determining a partition associated with the S-NSSAI and/or the PLMN ID; determining an amount of available resources on the partition; and determining to page the communication device based on the amount of available resources exceeding a predetermined threshold amount.

In additional or alternative embodiments, determining to page the communication device includes determining that the paging priority exceeds a threshold value. In additional or alternative embodiments, processing circuitry 603 determines the threshold value based on the S-NSSAI information and/or the PLMN ID.

At block 930, processing circuitry 603 pages, via transceiver 601, the communication device. At block 940, processing circuitry 603 receives, via transceiver 601, a radio resource control ("RRC") setup request message from the communication device. At block 950, processing circuitry 603 fetches, via network interface 607, context information associated with the communication device from the second network node.

In some embodiments, the communications network is a 5G network. In additional or alternative embodiments, the first network node is a RAN node and the second network node is a CN node. In additional or alternative embodiments, the first network node is a first RAN node and the second network node is a second RAN node (e.g., an anchor RAN node in which communication device context information is stored).

Various operations of FIGS. 8-9 may be optional with respect to some embodiments of network nodes and related methods. For example, regarding the method of Example Embodiment 1 below, operations of blocks 820 and 830 of FIG. 8 and blocks 920, 930, 940, and 950 of FIG. 9 may be optional.

Figure 10:
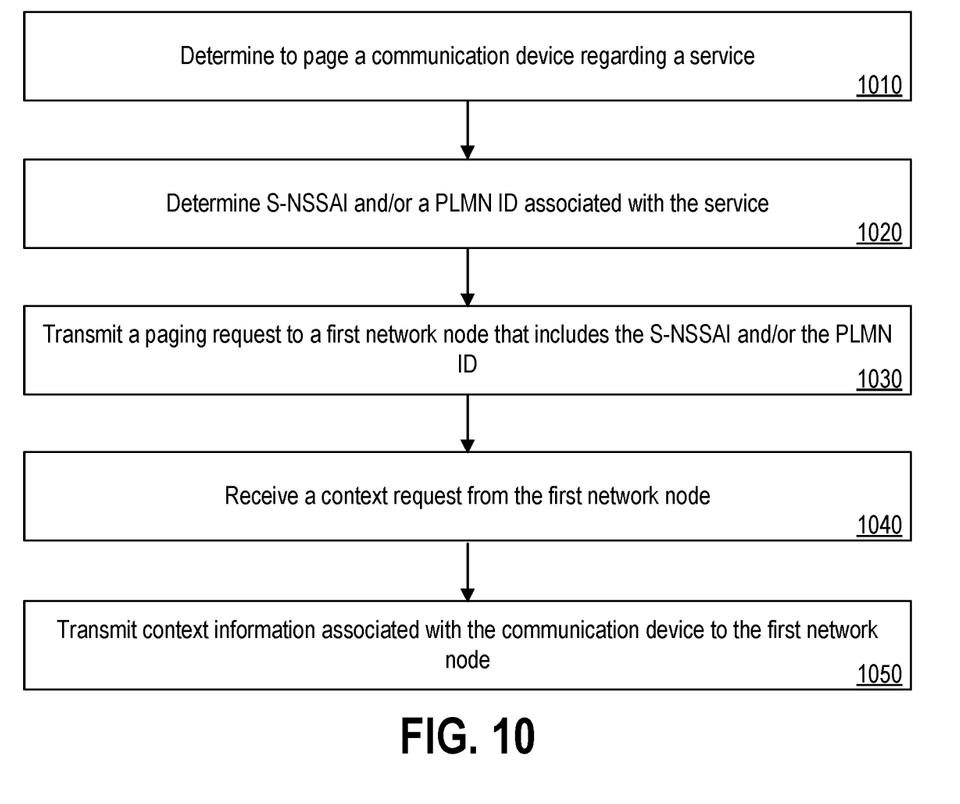
FIG. 10 is a flow chart illustrating an example of an operation performed by a second network node in accordance with some embodiments.

Operations of a second network node will now be discussed with reference to the flow chart of FIG. 10 according to some embodiments of inventive concepts. FIG. 10 will be described below as being performed by a CN node 700 as implemented using the structure of the block diagram of FIG. 7). For example, modules may be stored in memory 705 of FIG. 7, and these modules may provide instructions so that when the instructions of a module are executed by respective processing circuitry 703, processing circuitry 703 performs respective operations of the flow charts. However, the operations in FIG. 10 may be performed by any suitable network node including a RAN node such as RAN node 600.

FIG. 10 illustrates an example of operations performed by a second network node operating in a communications network that includes a first network node to handle paging a communication device based on S-NSSAI or a PLMN ID.

At block 1010, processing circuitry 703 determines to page a communication device regarding a service. In some embodiments, determining to page the communication device regarding the service includes receiving downlink data packets associated with the service and intended for the communication device.

At block 1020, processing circuitry 703 determines S-NSSAI and/or a PLMN ID associated with the service. At block 1030, processing circuitry 703 transmits, via network interface 707, a paging request to the first network node. The paging request can include the S-NSSAI and/or the PLMN ID.

At block 1040, processing circuitry 703 receives, via network interface 707, a context request from the first network node. At block 1050, processing circuitry 703 transmits, via network interface 707, context information associated with the communication device to the first network node.

In some embodiments, the communications network is a 5G network. In additional or alternative embodiments, the first network node is a RAN node and the second network node is a CN node. In additional or alternative embodiments, the first network node is a first RAN node and the second network node is a second RAN node (e.g., an anchor RAN node in which communication device context information for the communication device is stored).

In additional or alternative embodiments, the first network node may determine not to page the communication device based on a load on a partition associated with the S-NSSAI or the PLMN ID. In some examples, rather than operations 1040 and 1050, the processing circuitry 703 may receive an indication that the first network node will not be paging the communication device. In additional or alternative examples, the processing circuitry 703 may determine that the first network node will not be paging the communication device based on a predetermined amount of time elapsing.

Although the operations of FIG. 10 are described above as being performed by a CN node, the operations may be performed by a RAN node (e.g., an anchor RAN node).

Various operations of FIG. 10 may be optional with respect to some embodiments of network nodes and related methods. For example, regarding the method of Example Embodiment 9 below, for example, operations of blocks 1040 and 1050 of FIG. 10 may be optional.

Example Embodiments are included below.

Embodiment 1. A method of operating a first network node operating in a communications network that includes a second network node, the method comprising:
  receiving (810) a message from the second network node, the message including a request to page a communication device and a single-network slice selection assistance information, S-NSSAI, associated with the request; and
  determining (820, 920) whether to page the communication device based on the S-NSSAI.

Embodiment 2. The method of Embodiment 1, wherein determining whether to page the communication device comprises determining (820) not to page the communication device,
  the method further comprising:
    responsive to determining not to page the communication device, discarding (830) the message.

Embodiment 3. The method of Embodiment 1, wherein determining whether to page the communication device comprises determining (920) to page the communication device,
  the method further comprising:
    responsive to determining to page the communication device, paging (930) the communication device;
    responsive to paging the communication device, receiving (940) a radio resource control, RRC, setup request message from the communication device; and
    responsive to receiving the RRC setup request message, fetching (950) context information associated with the communication device from the second network node.

Embodiment 4. The method of any of Embodiments 1-3, wherein determining whether to page the communication device comprises:

determining a network slice associated with the S-NSSAI;
determining an amount of available resources on the network slice; and
determining whether to page the communication device based on whether the amount of available resources exceeds a predetermined threshold amount.

Embodiment 5. The method of any of Embodiments 1-4, wherein the message further includes a paging priority associated with the request,
wherein determining whether to page the communication device further comprises determining whether the paging priority exceeds a threshold value.

Embodiment 6. The method of Embodiment 5, wherein determining whether the paging priority exceeds the threshold value comprises determining the threshold value based on the S-NSSAI.

Embodiment 7. The method of any of Embodiments 1-6, wherein the communications network is a $5^{th}$ generation, 5G, network,
wherein the first network node comprises a radio access network, RAN, node, and
wherein the second network node is a core network, CN, node.

Embodiment 8. The method of any of Embodiments 1-6, wherein the communications network is a $5^{th}$ generation, 5G, network,
wherein the first network node comprises a first radio access network, RAN, node, and
wherein the second network node comprises a second RAN node.

Embodiment 9. A method of operating a second network node operating in a communications network that includes a first network node, the method comprising:
determining (1010) to page a communication device regarding a service;
determining (1020) single-network slice selection assistance information, S-NSSAI, associated with the service; and
transmitting (1030) a paging request that includes the S-NSSAI to the first network node.

Embodiment 10. The method of Embodiment 9, wherein determining to page the communication device regarding the service comprises receiving downlink data packets associated with the service and intended for the communication device.

Embodiment 11. The method of any of Embodiments 9-10, further comprising:
responsive to transmitting the paging request, receiving (1040) a context request from the first network node requesting context information for the communication device; and
responsive to receiving the context request, transmitting (1050) the context information to the first network node.

Embodiment 12. The method of any of Embodiments 9-11, wherein the communications network is a $5^{th}$ generation, 5G, network,
wherein the first network node comprises a radio access network, RAN, node, and
wherein the second network node is a core network, CN, node.

Embodiment 13. The method of any of Embodiments 9-11, wherein the communications network is a $5^{th}$ generation, 5G, network,
wherein the first network node comprises a first radio access network, RAN, node, and
wherein the second network node comprises a second RAN node.

Embodiment 14. A first network node (600) operating in a communications network that includes a second network node (600, 700), the first network node comprising:
processing circuitry (603); and
memory (605) coupled to the processing circuitry and having instructions stored therein that are executable by the processing circuitry for causing the first network node to perform operations, the operations comprising:
receiving (810) a message from the second network node, the message including a request to page a communication device and single-network slice selection assistance information, S-NSSAI, associated with the request; and
determining (820, 920) whether to page the communication device based on the S-NSSAI.

Embodiment 15. The first network node of Embodiment 14, wherein determining whether to page the communication device comprises determining (820) not to page the communication device,
the operations further comprising:
responsive to determining not to page the communication device, discarding (830) the message.

Embodiment 16. The first network node of Embodiment 14, wherein determining whether to page the communication device comprises determining (920) to page the communication device,
the operations further comprising:
responsive to determining to page the communication device, paging (930) the communication device;
responsive to paging the communication device, receiving (940) a radio resource control, RRC, setup request message from the communication device; and
responsive to receiving the RRC setup request message, fetching (950) context information associated with the communication device from the second network node.

Embodiment 17. The first network node of any of Embodiments 14-16, wherein determining whether to page the communication device comprises:
determining a network slice associated with the S-NSSAI;
determining an amount of available resources on the network slice; and
determining whether to page the communication device based on whether the amount of available resources exceeds a predetermined threshold amount.

Embodiment 18. The first network node of any of Embodiments 14-17, wherein the message further includes a paging priority associated with the request,
wherein determining whether to page the communication device further comprises determining whether the paging priority exceeds a threshold value.

Embodiment 19. The first network node of Embodiment 18, wherein determining whether the paging priority exceeds the threshold value comprises determining the threshold value based on the S-NSSAI.

Embodiment 20. The first network node of any of Embodiments 14-19, wherein the communications network is a $5^{th}$ generation, 5G, network,
wherein the first network node comprises a radio access network, RAN, node, and
wherein the second network node is a core network, CN, node.

Embodiment 21. The first network node of any of Embodiments 14-19, wherein the communications network is a 5$^{th}$ generation, 5G, network,
  wherein the first network node comprises a first radio access network, RAN, node, and
  wherein the second network node comprises a second RAN node.

Embodiment 22. A first network node (600) operating in a communications network that includes a second network node (600, 700), the first network node adapted to perform operations, the operations including:
  receiving (810) a message from the second network node, the message including a request to page a communication device and single-network slice selection assistance information, S-NSSAI, associated with the request; and
  determining (820, 920) whether to page the communication device based on the S-NSSAI.

Embodiment 23. A first network node (600) operating in a communications network that includes a second network node (600, 700), the first network adapted to perform any of the operations of claims 1-8.

Embodiment 24. A computer program comprising program code to be executed by processing circuitry (603) of a first network node (600) operating in a communications network that includes a second network node (600, 700), whereby execution of the program code causes the first network node to perform operations, the operations comprising:
  receiving (810) a message from the second network node, the message including a request to page a communication device and single-network slice selection assistance information, S-NSSAI, associated with the request; and
  determining (820, 920) whether to page the communication device based on the S-NSSAI.

Embodiment 25. A computer program comprising program code to be executed by processing circuitry (603) of a first network node (600) operating in a communications network that includes a second network node (600, 700), whereby execution of the program code causes the first network node to perform any of the operations of claims 1-8.

Embodiment 26. A computer program product comprising a non-transitory storage medium including program code to be executed by processing circuitry (603) of a first network node (600) operating in a communications network that includes a second network node (600, 700), whereby execution of the program code causes the first network node to perform operations, the operations comprising:
  receiving (810) a message from the second network node, the message including a request to page a communication device and single-network slice selection assistance information, S-NSSAI, associated with the request; and
  determining (820, 920) whether to page the communication device based on the S-NSSAI.

Embodiment 27. A computer program product comprising a non-transitory storage medium including program code to be executed by processing circuitry (603) of a first network node (600) operating in a communications network that includes a second network node (600, 700), whereby execution of the program code causes the first network node to perform any of the operations of claims 1-8.

Embodiment 28. A second network node (600, 700) operating in a communications network that includes a first network node (600), the second network node comprising:
  processing circuitry (603, 703); and
  memory (605, 705) coupled to the processing circuitry and having instructions stored therein that are executable by the processing circuitry for causing the second network node to perform operations, the operations comprising:
    determining (1010) to page a communication device regarding a service;
    determining (1020) single-network slice selection assistance information, S-NSSAI, associated with the service; and
    transmitting (1030) a paging request that includes the S-NSSAI to the first network node.

Embodiment 29. The second network node of Embodiment 28, wherein determining to page the communication device regarding the service comprises receiving downlink data packets associated with the service and intended for the communication device.

Embodiment 30. The second network node of any of Embodiments 28-29, the operations further comprising:
  responsive to transmitting the paging request, receiving (1040) a context request from the first network node requesting context information for the communication device; and
  responsive to receiving the context request, transmitting (1050) the context information to the first network node.

Embodiment 31. The second network node of any of Embodiments 28-30, wherein the communications network is a 5$^{th}$ generation, 5G, network,
  wherein the first network node comprises a radio access network, RAN, node, and
  wherein the second network node is a core network, CN, node.

Embodiment 32. The second network node of any of Embodiments 28-30, wherein the communications network is a 5$^{th}$ generation, 5G, network,
  wherein the first network node comprises a first radio access network, RAN, node, and
  wherein the second network node comprises a second RAN node.

Embodiment 33. A second network node (600, 700) operating in a communications network that includes a first network node (600), the second network node adapted to perform operations, the operations including:
  determining (1010) to page a communication device regarding a service;
  determining (1020) single-network slice selection assistance information, S-NSSAI, associated with the service; and
  transmitting (1030) a paging request that includes the S-NSSAI to the first network node.

Embodiment 34. A second network node (600, 700) operating in a communications network that includes a first network node (600), the second network adapted to perform any of the operations of claims 9-13.

Embodiment 35. A computer program comprising program code to be executed by processing circuitry (603, 703) of a second network node (600, 700) operating in a communications network that includes a first network node (600), whereby execution of the program code causes the second network node to perform operations, the operations comprising:
  determining (1010) to page a communication device regarding a service;
  determining (1020) single-network slice selection assistance information, S-NSSAI, associated with the service; and transmitting (1030) a paging request that includes the S-NSSAI to the first network node.

Embodiment 36. A computer program comprising program code to be executed by processing circuitry (603, 703) of a second network node (600, 700) operating in a communications network that includes a first network node (600), whereby execution of the program code causes the second network node to perform any of the operations of claims 9-13.

Embodiment 37. A computer program product comprising a non-transitory storage medium including program code to be executed by processing circuitry (603, 703) of a second network node (600, 700) operating in a communications network that includes a first network node (600), whereby execution of the program code causes the second network node to perform operations, the operations comprising:

determining (1010) to page a communication device regarding a service;
determining (1020) single-network slice selection assistance information, S-NSSAI, associated with the service; and
transmitting (1030) a paging request that includes the S-NSSAI to the first network node.

Embodiment 38. A computer program product comprising a non-transitory storage medium including program code to be executed by processing circuitry (603, 703) of a second network node (600, 700) operating in a communications network that includes a first network node (600), whereby execution of the program code causes the second network node to perform any of the operations of claims 9-13.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a first network node operating in a communications network that includes a second network node, the method comprising:
receiving a message from the second network node, the message including a request to page a communication device and a single-network slice selection assistance information, S-NSSAI, and/or a public land mobile network, PLMN, identifier, ID, associated with the request; and
determining whether to page the communication device based on the S-NSSAI and/or the PLMN ID, wherein determining whether to page the communication device comprises:
determining a partition associated with the S-NSSAI or the PLMN ID;
determining an amount of available resources on the partition; and
determining whether to page the communication device based on whether the amount of available resources exceeds a predetermined threshold amount.

2. The method of claim 1, wherein determining whether to page the communication device comprises determining not to page the communication device,
the method further comprising:
responsive to determining not to page the communication device, discarding the message.

3. The method of claim 1, wherein determining whether to page the communication device comprises determining to page the communication device,
the method further comprising:
responsive to determining to page the communication device, paging the communication device;
responsive to paging the communication device, receiving a radio resource control, RRC, setup request message from the communication device; and
responsive to receiving the RRC setup request message, fetching context information associated with the communication device from the second network node.

4. The method of claim 1, wherein the message further includes a paging priority associated with the request, wherein determining whether to page the communication device further comprises determining whether the paging priority exceeds a threshold value.

5. The method of claim 4, wherein determining whether the paging priority exceeds the threshold value comprises determining the threshold value based on the S-NSSAI or the PLMN ID.

6. The method of claim 1, wherein the communications network is a generation, 5G, network,
wherein one of:
the first network node comprises a radio access network, RAN, node, and the second network node is a core network, CN, node; or
the first network node comprises a first radio access network, RAN, node, and the second network node comprises a second RAN node.

7. The method of claim 1, wherein the message includes a S-NSSAI associated with the request, and
wherein determining whether to page the communication device comprises determining whether to page the communication device based on the S-NSSAI.

8. The method of claim 1, wherein the message includes a PLMN ID associated with the request, and
wherein determining whether to page the communication device comprises determining whether to page the communication device based on the PLMN ID.

9. A method of operating a second network node operating in a communications network that includes a first network node, the method comprising:
determining to page a communication device regarding a service;
determining single-network slice selection assistance information, S-NSSAI, and/or a public land mobile network, PLMN, identifier, ID, associated with the service; and
transmitting a paging request that includes the S-NSSAI or the PLMN ID to the first network node; and
determining that the first network node will not page the communication device based on (i) a received indication from the first network node or (ii) expiration of a predetermined amount of time without receiving a response.

10. The method of claim 9, wherein determining to page the communication device regarding the service comprises receiving downlink data packets associated with the service and intended for the communication device.

11. The method of claim 9, further comprising:
responsive to transmitting the paging request, receiving a context request from the first network node requesting context information for the communication device; and
responsive to receiving the context request, transmitting the context information to the first network node.

12. The method of claim 9, wherein the communications network is a $5^{th}$ generation, 5G, network,
wherein one of:
the first network node comprises a radio access network, RAN, node, and the second network node is a core network, CN, node; or
the first network node comprises a first radio access network, RAN, node, and the second network node comprises a second RAN node.

13. The method of claim 9, wherein determining the S-NSSAI or the PLMN ID comprises determining the S-NSSAI associated with the service, and
wherein one of:
transmitting the paging request comprises transmitting the paging request that includes the S-NSSAI; or determining the S-NSSAI or the PLMN ID comprises determining the PLMN ID associated with the service, and transmitting the paging request comprises transmitting the paging request that includes the PLMN ID.

14. A first network node operating in a communications network that includes a second network node, the first network node comprising:
- processing circuitry; and
- memory coupled to the processing circuitry and having instructions stored therein that are executable by the processing circuitry for causing the first network node to perform any of the operations of claim 1.

15. A computer program comprising program code to be executed by processing circuitry of a first network node operating in a communications network that includes a second network node, whereby execution of the program code causes the first network node to perform any of the operations of claim 1.

16. A computer program product comprising a non-transitory storage medium including program code to be executed by processing circuitry of a first network node operating in a communications network that includes a second network node, whereby execution of the program code causes the first network node to perform any of the operations of claim 1.

17. A second network node operating in a communications network that includes a first network node, the second network node comprising:
- processing circuitry; and
- memory coupled to the processing circuitry and having instructions stored therein that are executable by the processing circuitry for causing the second network node to perform any of the operations of claim 9.

18. A computer program product comprising a non-transitory storage medium including program code to be executed by processing circuitry of a second network node operating in a communications network that includes a first network node, whereby execution of the program code causes the second network node to perform any of the operations of claim 9.

\* \* \* \* \*